UNITED STATES PATENT OFFICE.

PHILLIP SHERMAN, OF TOLEDO, OHIO.

FROST AND OBSCURING CONDENSATION PREVENTIVE FOR GLASS SURFACES AND METHOD OF PREPARING THE SAME.

1,410,839. Specification of Letters Patent. Patented Mar. 28, 1922.

No Drawing. Application filed July 21, 1920. Serial No. 397,976.

*To all whom it may concern:*

Be it known that I, PHILLIP SHERMAN, a citizen of Poland, and residing at Toledo, in the county of Lucas and State of Ohio, have invented a new and useful Frost and Obscuring Condensation Preventive for Glass Surfaces and Method of Preparing the Same, of which the following is a specification.

The invention comprises a composition to be applied to the surface of the glass, such as is found in windshields of automobiles or in windows, whereby to prevent the glass from steaming or frosting and to keep it clear from obscuring by rain or snow.

The composition consists of a mixture of mineral oil, such as coal oil, calcium chloride, vinegar and water. In preparing the composition, the several ingredients are preferably used in about the following proportions: coal oil $\frac{1}{3}$ ounce boiled until the quantity is reduced to $\frac{1}{4}$ ounce, $\frac{1}{2}$ pint of vinegar, $\frac{1}{2}$ pint of water and 1 ounce of calcium chloride. The vinegar, water and calcium chloride are boiled together and then poured into the coal oil while the latter is boiling.

A woolen cloth or a piece of felt is boiled in this composition until the felt is soaked through and the infiltrated felt is then dried in a hot place.

To treat an automobile windshield, the infiltrated felt is rubbed over the surface of the glass in accordance with circumstances. In freezing weather, the windshield should be treated before leaving the garage. In the case of rain, the windshield is rubbed with the felt every two hours and in the case of snowy weather, the windshield is rubbed with the felt at more frequent intervals. When the surface of the glass is treated as described, the surface will not accumulate deposits of frost, neither will it steam or become cloudy during cold weather or when rained upon. As soon as the water strikes the treated glass, it spreads and leaves the glass clear and unclouded. The treated felt may be mounted in a suitable holder or may be wadded up and used after the manner of a swab.

What is claimed is:—

1. A composition for treating glass surfaces to prevent obscuring condensation thereon, comprising a mixture of mineral oil, vinegar, water and calcium chloride.

2. A composition for treating glass surfaces to prevent obscuring condensation thereon, comprising coal oil, vinegar, water and calcium chloride in substantially the proportions of $\frac{1}{4}$ ounce of coal oil, $\frac{1}{2}$ pint of vinegar, $\frac{1}{2}$ pint of water and 1 ounce of calcium chloride.

3. A frost and obscuring-condensation preventive for glass surfaces, comprising a piece of fibrous material treated with a mixture of a mineral oil, vinegar, water and calcium chloride.

4. The method of preparing a frost and obscuring condensation preventive for glass surfaces, which consists in concentrating the mineral oil by boiling, boiling together vinegar, water and calcium chloride and then combining them with the concentrated mineral oil while the latter is boiling.

5. The method of preparing a frost and obscuring condensation preventive for glass surfaces, which consists in concentrating the mineral oil by boiling, then boiling together vinegar, water and calcium chloride and mixing them with the concentrated mineral oil while the latter is boiling, and then soaking fibrous material in the mixture and drying such material for use.

PHILLIP SHERMAN.